United States Patent
Reddy et al.

(10) Patent No.: US 6,722,434 B2
(45) Date of Patent: Apr. 20, 2004

(54) METHODS OF GENERATING GAS IN WELL TREATING FLUIDS

(75) Inventors: B. Raghava Reddy, Duncan, OK (US); Krishna M. Ravi, Kingwood, TX (US); Karen Luke, Duncan, OK (US); Rickey L. Morgan, Comanche, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 68 days.

(21) Appl. No.: 10/159,588

(22) Filed: May 31, 2002

(65) Prior Publication Data

US 2003/0221831 A1 Dec. 4, 2003

(51) Int. Cl.[7] .................. E21B 43/22; E21B 33/13; C09K 17/00; C09K 3/00
(52) U.S. Cl. .............. 166/292; 166/308; 166/300; 507/202; 507/902; 106/672; 106/673; 106/675; 106/677; 106/678
(58) Field of Search .................. 166/293, 294, 166/292, 300, 308; 106/673, 672, 675, 678, 677; 507/922, 202, 902

(56) References Cited

U.S. PATENT DOCUMENTS

| | | | |
|---|---|---|---|
| 3,591,394 A | 7/1971 | Diggelmann et al. | 106/87 |
| 3,958,638 A | 5/1976 | Johnston | 166/294 |
| 4,142,909 A | 3/1979 | Gaines | 106/87 |
| 4,201,678 A | 5/1980 | Pye et al. | 252/8.5 A |
| 4,219,083 A | 8/1980 | Richardson et al. | 166/300 |
| 4,232,741 A | 11/1980 | Richardson et al. | 166/281 |
| 4,289,633 A | 9/1981 | Richardson et al. | 252/8.55 B |
| 4,304,298 A | 12/1981 | Sutton | 166/293 |
| 4,333,764 A | 6/1982 | Richardson | 106/87 |
| 4,340,427 A | 7/1982 | Sutton | 106/87 |
| 4,367,093 A | 1/1983 | Burkhalter et al. | 106/87 |
| 4,450,010 A | 5/1984 | Burkhalter et al. | 106/87 |
| 4,452,898 A * | 6/1984 | Richardson | 436/2 |
| 4,565,578 A | 1/1986 | Sutton et al. | 106/87 |
| 4,692,269 A | 9/1987 | Kmiec et al. | 252/350 |
| 4,741,401 A | 5/1988 | Walles et al. | 166/300 |
| 4,813,484 A | 3/1989 | Hazlett | 166/270 |
| 4,844,163 A | 7/1989 | Hazlett et al. | 166/270 |
| 4,848,465 A * | 7/1989 | Hazlett | 166/270 |
| 4,899,819 A | 2/1990 | Hazlett et al. | 166/285 |
| 5,373,901 A | 12/1994 | Norman et al. | 166/300 |
| 5,413,178 A | 5/1995 | Walker et al. | 166/300 |
| 5,613,558 A | 3/1997 | Dillenbeck, III | 166/293 |
| 5,658,380 A | 8/1997 | Dillenbeck, III | 106/823 |
| 5,669,446 A | 9/1997 | Walker et al. | 166/300 |
| 5,789,352 A | 8/1998 | Carpenter et al. | 507/209 |
| 5,950,731 A | 9/1999 | Shuchart et al. | 166/300 |
| 5,962,808 A | 10/1999 | Lundstrom | 149/19.1 |
| 5,972,103 A * | 10/1999 | Mehta et al. | 106/728 |
| 5,996,693 A | 12/1999 | Heathman | 166/291 |
| 6,035,933 A | 3/2000 | Khalil et al. | 166/263 |
| 6,063,738 A | 5/2000 | Chatterji et al. | 507/269 |
| 6,138,760 A | 10/2000 | Lopez et al. | 166/300 |
| 6,162,839 A | 12/2000 | Klauck et al. | 521/83 |
| 6,187,720 B1 * | 2/2001 | Acker et al. | 507/238 |
| 6,209,646 B1 | 4/2001 | Reddy et al. | 166/300 |
| 6,270,565 B1 | 8/2001 | Heathman | 106/696 |
| 6,364,945 B1 * | 4/2002 | Chatterji et al. | 106/677 |
| 6,419,016 B1 * | 7/2002 | Reddy | 166/293 |
| 6,444,316 B1 * | 9/2002 | Reddy et al. | 428/407 |
| 6,460,632 B1 | 10/2002 | Chatterji et al. | 175/66 |
| 6,592,660 B2 * | 7/2003 | Nguyen et al. | 106/677 |
| 2002/0035951 A1 | 3/2002 | Chatterji et al. | 106/677 |

OTHER PUBLICATIONS

"Specification for Materials and Testing for Well Cements," API Specification 10 (SPEC 10), 5th Ed., Jul. 1, 1990.

* cited by examiner

*Primary Examiner*—David Bagnell
*Assistant Examiner*—Thomas S Bomar
(74) *Attorney, Agent, or Firm*—Craig W. Roddy; C. Clark Dougherty, Jr.

(57) ABSTRACT

Improved methods of generating gas in and foaming well treating fluids introduced into a subterranean zone are provided. A method of the invention includes the steps of combining one or more gas generating chemicals with the well treating fluid and combining one or more delayed encapsulated activators having selected release times with the well treating fluid containing the gas generating chemicals so that the gas generating chemicals react with the delayed encapsulated oxidizing agent activators and gas and foam are formed in the treating fluid while the treating fluid is being pumped and after being placed in the subterranean zone.

32 Claims, No Drawings

METHODS OF GENERATING GAS IN WELL TREATING FLUIDS

BACKGROUND OF THE INVENTION

1. Field of the Invention

The present invention relates to methods of generating gas in and foaming well treating fluids during pumping of the treating fluids or after the treating fluids are placed in a subterranean zone, or both.

2. Description of the Prior Art

Foamed treating fluids have heretofore been utilized in a number of oil and gas well applications. Typically, a treating fluid is foamed by combining a mixture of foaming and foam stabilizing surfactants with the treating fluid on the surface followed by injecting gas, typically nitrogen, into the treating fluid containing the foaming and foam stabilizing surfactants as the treating fluid is pumped to the well head and into the well bore. This process allows the treating fluid to have gas concentrations of 1% to 80% by volume of the fluid depending on the downhole pressure and temperature and the amount of gas injected at surface. However, the equipment required for storing the nitrogen in liquid or gaseous form and injecting it into a well treating fluid is very elaborate and expensive. In addition, the equipment is frequently unavailable or cannot be easily transported to well sites due to their remote locations.

In situ gas forming agents have been utilized heretofore in well cement compositions to prevent annular gas migration. For example, surfactant coated finely ground aluminum has been included in cement compositions to generate hydrogen gas in the compositions as they are being pumped down a well bore and after they are placed in the annulus between the walls of the well bore and casing or other pipe string therein. The presence of the gas in the cement compositions prevents formation fluids from entering the cement compositions as the cement compositions develop gel strength. That is, the development of gel strength reduces the ability of a cement composition column to transmit hydrostatic pressure. If the hydrostatic pressure of the cement composition column falls below the formation pore pressure before the cement composition has gained sufficient strength to prevent the entry of formation fluids into the well bore, the fluids enter the well bore and form channels in the cement composition column which remain after the cement composition column sets. The presence of the gas which is generated in the cement composition from the finely ground aluminum increases the volume of the cement composition such that the volume increase generated by the gas equals or slightly exceeds the cement composition volume reduction during the development of gel strength due to fluid loss and/or the cement hydration reaction. The increase in volume and the compressibility produced in the cement composition by the gas allows the cement composition column to resist the entry of formation fluids into the well bore.

Other gas forming agents have also been added to well cement compositions to gasify the compositions. For example, U.S. Pat. No. 4,450,010 issued on May 22, 1984 to Burkhalter et al. discloses a well cementing method and gasified cements useful in carrying out the method. That is, U.S. Pat. No. 4,450,010 discloses a method of cementing in subterranean formations using a gasified cement composition which prevents formation fluids from entering the cement composition column formed in the annulus between the well bore and a pipe string therein. The cement composition includes a nitrogen gas generating material, an oxidizing agent and a reaction rate control material whereby a quantity of gas is generated in the cement composition to offset the shrinkage in the cement composition column as it develops gel strength and to provide compressibility thereto whereby the entry of formation fluids into the well bore is reduced or prevented. While the methods and cement compositions of the prior art have achieved varying degrees of commercial success, there are needs for improved methods of generating gas in well cement compositions and other well fluids whereby the well fluids can be foamed in situ at various selected times during their use to produce a variety of desired downhole results. The control of the timing of in situ gas generation until after the well fluids are pumped also helps in preventing air-locking of the mechanical pumps used.

A situation where the presence of gas in a cement composition will provide a distinct advantage involves problems associated with high fluid pressure buildup behind cemented casing. Occasionally, drilling fluid and cement spacer fluids are left behind casing during the cementing of the casing in a well bore. When the well is put on production, the formation temperature heats up the trapped drilling and/or spacer fluids causing severe high pressure build ups due to the incompressibility of the fluids which can cause damage to the casing. The presence of a compressible gas behind the casing in drilling fluid and cement spacer fluids, either in the form of a gas pocket or foam, will help sustain the temperature increases without severe pressure buildups.

SUMMARY OF THE INVENTION

The present invention provides improved methods of generating gas in and foaming well treating fluids introduced into subterranean zones penetrated by well bores which meet the needs described above and overcome the deficiencies of the prior art. An improved method of the present invention comprises the following steps. One or more gas generating chemicals are combined with the well treating fluid on the surface. At the same time, one or more delayed encapsulated activators having selected release times are also combined with the well treating fluid so that the gas generating chemicals react with the one or more delayed encapsulated activators and gas and foam are formed in the treating fluid while it is being pumped or at one or more times after the treating fluid has been placed in a subterranean zone, or both. Thereafter, the treating fluid containing the gas generating chemicals and the delayed encapsulated activators is pumped into the subterranean zone to be treated.

Gas generating chemicals which are useful in accordance with the present invention include, but are not limited to, compounds containing hydrazine or azo groups, for example, hydrazine, azodicarbonamide, azobis (isobutyronitrile), p-toluene sulfonyl hydrazide, p-toluene sulfonyl semicarbazide, carbohydrazide, p-p'-oxybis (benzenesulfonylhydrazide) and mixtures thereof. Examples of nitrogen gas generating chemicals which do not contain hydrazine or azo groups which are also useful in the present invention include, but are not limited to, ammonium salts of organic or inorganic acids, hydroxylamine sulfate, carbamide and mixtures thereof.

The encapsulated activators which can be utilized include, but are not limited to, alkaline materials such as carbonate, hydroxide and oxide salts of alkali and alkaline earth metals such as lithium, sodium, magnesium and calcium, oxidizing agents such as alkali and alkaline earth metal salts of peroxide, persulfate, perborate, hypochlorite, hypobromite, chlorite, chlorate, iodate, bromate, chloroaurate, arsenate, antimonite and molybate anions. Specific examples of the oxidizing agents include ammonium persulfate, sodium persulfate, potassium persulfate, sodium chlorite, sodium chlorate, hydrogen peroxide, sodium perborate and sodium peroxy carbonate. The well treating fluids in which the methods of this invention are particularly useful include aqueous cement compositions and aqueous fracturing fluids.

The objects, features and advantages of the present invention will be readily apparent to those skilled in the art upon a reading of the description of preferred embodiments which follows.

DESCRIPTION OF PREFERRED EMBODIMENTS

The present invention provides improved methods of generating gas in and foaming well treating fluids while the treating fluids are being pumped and/or after being placed in a subterranean zone. In accordance with the invention, one or more gas generating chemicals and one or more delayed encapsulated activators are combined with a well treating fluid such as a hydraulic cement slurry, a fracturing fluid or the like. The treating fluid must be alkaline or made alkaline, i.e., the treating fluid must have a pH in the range of from about 10 to about 14.

The gas generating chemicals useful in accordance with this invention primarily generate nitrogen along with small amounts of ammonia depending on the chemical structure of the gas generating chemical and the activating agent. When the gas generating chemical molecule contains amide groups, additional ammonia, carbon dioxide (an acidic gas), and carbon monoxide may be produced. The gas generating chemicals are generally solid materials that liberate gas or gases on their own when they are heated to a temperature in the range of from about 200° F. to about 500° F. without requiring alkaline or oxidizing chemicals. In order to cause the gas generating chemicals to generate gases at particular temperatures and/or times, one or more delayed encapsulated activators having selected release times are combined with the treating fluid containing one or more gas generating chemicals. After the gas generating chemical or chemicals and delayed encapsulated activator or activators have been combined with the treating fluid, the treating fluid is pumped into a subterranean zone to be treated by way of the well bore.

As mentioned, the gas generating chemicals and delayed encapsulated activators can be used to generate gas in and foam a treating fluid at different temperatures and times during pumping and after placement. For example, nitrogen gas can be caused to be produced in an aqueous cement composition while being pumped to foam the composition and provide thixotropy thereto, after being placed in the subterranean zone during the static cement composition gel strength development stage to compensate for cement shrinkage caused by fluid loss, during the cement transition time to prevent the inflow of formation fluids and during setting of the cement to provide resiliency thereto.

Gas generating chemicals which can be utilized in accordance with the methods of the present invention include, but are not limited to, compounds containing hydrazine or azo groups, for example, hydrazine, azodicarbonamide, azobis (isobutyronitrile), p-toluene sulfonyl hydrazide, p-toluene sulfonyl semicarbazide, carbohydrazide, p-p'-oxybis (benzenesulfonylhydrazide) and mixtures thereof. Additional examples of nitrogen gas generating chemicals which do not contain hydrazine or azo groups and which are also useful in the present invention include, but are not limited to, ammonium salts of organic or inorganic acids, hydroxylamine sulfate, carbamide and mixtures thereof Of these, azodicarbonamide or carbohydrazide are preferred. The gas generating chemical or chemicals utilized are combined with the well treating fluid in a general amount, depending on the amount of gas desired under downhole conditions, in the range of from about 0.1% to about 10% by weight of the treating fluid, more preferably in an amount in the range of from about 0.3% to about 8% and most preferably about 4%.

The generation of gas from the gas generating chemicals depends on the structure of the gas generating chemicals. When the chemical contains an azo group containing two nitrogens connected by a double bond as in azodicarbonamide, the gas generation is caused either thermally or by reaction with alkaline reagents. The reactions with the azocarbonamide generate ammonia gas and possibly carbon dioxide and release the doubly charged diimide group. The diimide dianion being chemically unstable decomposes to nitrogen gas.

The gas generating chemicals containing hydrazide groups in which the two nitrogen atoms are connected by a single bond as well as connected to one or two hydrogens produce gas upon reaction with an oxidizing agent. It is believed that the oxidizing agent oxidizes the hydrazide group to azo structure. Therefore, hydrazide materials containing two mutually single bonded nitrogens which in turn are also bonded to one or more hydrogens need oxidizing agents for activation. To enhance the water solubility of such materials, alkaline pH is generally required. Occasionally, additional chemicals may be needed to increase the rate of gas production.

Examples of delayed encapsulated activators which can be used include, but are not limited to, alkaline materials such as carbonate, hydroxide and oxide salts of alkali and alkaline earth metals such as lithium, sodium, magnesium and calcium and oxidizing agents such as alkali and alkaline earth metal salts of peroxide, persulfate, perborate, hypochlorite, hypobromite, chlorite, chlorate, iodate, bromate, chloroaurate, arsenate, antimonite and molybate anions. Specific examples of the oxidizing agents include ammonium persulfate, sodium persulfate, potassium persulfate, sodium chlorite, sodium chlorate, hydrogen peroxide, sodium perborate and sodium peroxy carbonate. Other examples of oxidizers which can be used in the present invention are disclosed in U.S. Pat. No. 5,962,808 issued to Landstrom on Oct. 5, 1999 which is incorporated herein by reference thereto. Of the various activators that can be used, sodium or ammonium persulfate and sodium chlorite are preferred. The active amounts of the oxidizing activator or activators included in the well treating fluid in the encapsulated form range from about 2 to about 15 times the weight of the gas generating chemical or chemicals therein, more preferably in an amount of about 4 to about 12 times the weight of the gas generating chemical. The actual amounts of the alkaline material used in the well treating fluid should be sufficient to maintain the pH of the fluid between 10 and 14. The activator or activators used and their amounts are selected for the activator's ability to cause the gas generating chemical or chemicals to generate gas at a particular temperature or range of temperatures. The temperatures at which various activators cause a particular gas generating chemical to produce gas can be readily determined in the laboratory.

The activators can be encapsulated with various materials which delay their reaction with the gas generating chemical or chemicals used. Solid activators can be encapsulated by spray coating a variety of materials thereon. Such coating materials include, but are not limited to, waxes, drying oils such as tung oil and linseed oil, polyurethanes and cross-linked partially hydrolyzed polyacrylics. Of these, cross-linked partially hydrolyzed acrylics are preferred. Because of the oxidizing and corrosive nature of the activators, an additional undercoat of polymeric materials such as styrene-butadiene may be deposited on the solid activator particles prior to depositing the slow releasing polymeric coating. This method is particularly suitable for encapsulating hygroscopic alkaline activator materials such as hydroxide salts of lithium, sodium and potassium and is described in detail in co-pending U.S. patent application Ser. No. 09/565,092 filed on May 5, 2000 entitled Encapsulated Chemicals For Use In Controlled Time Release Applications And Methods. The oxidizers are preferably encapsulated with a membrane comprising a partially hydrolyzed acrylic cross-linked with either an aziridine prepolymer or a carbodimide, the membrane having imperfections through which an aqueous fluid can diffuse. The cross-linked acrylic membrane and its use are disclosed in detail in U.S. Pat. No. 5,373,901 issued to Norman et al. on Dec. 20, 1994 which is incorporated herein by reference thereto. The activators may also be encapsulated in the form of aqueous solutions in a particulate porous solid material which remains dry and free flowing after absorbing an aqueous solution and through which the aqueous solution slowly diffuses. Examples of such particulate porous solid materials include, but are not limited to, diatomaceous earth, zeolites, silica, alumina, metal salts of alumino-silicates, clays, hydrotalcite, styrene-divinylbenzene based materials, cross-linked polyalkylacrylate esters and cross-linked modified starches. Of these, metal oxides, metal salts of alumino-silicates and cross-linked porous synthetic polymeric materials are preferred with precipitated silica being the most preferred. When the activators are alkaline materials, the inorganic porous carriers such as porous silica, alumina, or diatomaceous earth are not preferable since they react with the alkaline materials.

In order to provide additional delay to the oxidizing agent activators encapsulated in a particulate porous solid material described above, an external coating of a polymeric material through which an aqueous solution slowly diffuses can be placed on the porous solid material. Examples of such polymeric materials include, but are not limited to, EDPM rubber, polyvinyldichloride (PVDC), nylon, waxes, polyurethanes and cross-linked partially hydrolyzed acrylics. Of these, cross-linked partially hydrolyzed acrylics are preferred. The particulate porous solid materials and their use for encapsulating activators and the like are disclosed in detail in U.S. Pat. No. 6,209,646 B1 issued on Apr. 3, 2001 which is incorporated herein by reference thereto.

A gas production rate enhancing chemical may be used when rapid gas production is desired. Examples of such rate enhancing chemicals which can optionally be used include, but are not limited to, copper salts such as copper sulfate, ethylene diamine tetraacetic acid (EDTA) complexes of copper (2+) salts, iron salts including ferric sulfate or ferric nitrate. When the gas generation from the mixture of a gas generating chemical and an activator does not take place unless the rate enhancing material is present due to low application temperature or the like, the timing of the production of gas can be controlled by using encapsulated rate enhancing materials. The encapsulation methods used to encapsulate the rate enhancing materials are the same as those described above for encapsulating the activator materials.

In addition to the gas generating chemical or chemicals and delayed encapsulated activator or activators, a mixture of foaming and foam stabilizing surfactants can be combined with the treating fluid to facilitate the formation and stabilization of the treating fluid foam produced by the liberation of gas therein. An example of such a mixture of foaming and foam stabilizing surfactants which is preferred for use in accordance with this invention is comprised of an ethoxylated alcohol ether sulfate surfactant, an alkyl or alkene amidopropylbetaine surfactant and an alkyl or alkene amidopropyldimethylamine oxide surfactant. Such a surfactant mixture is described in U.S. Pat. No. 6,063,738 issued to Chatterji et al. on May 16, 2000 which is incorporated herein by reference thereto.

When the treating fluid in which gas is to be generated in accordance with this invention is an alkaline well cement composition, one or more gas generating chemicals as described above are included in the cement composition. Preferably, the gas generating chemicals are selected from the group consisting of azodicarbonamide, carbohydrazide and mixtures thereof. One or more delayed encapsulated activators having selected release times are combined with the cement composition containing the gas generating chemical or chemicals so that the gas generating chemical or chemicals react with one or more delayed encapsulated activators while the cement composition is being pumped and at one or more times after the cement composition has been placed in the subterranean zone to be cemented. After the gas generating chemical or chemicals and delayed encapsulated activator or activators have been combined with the cement composition, the cement composition is pumped into the well bore and into the subterranean zone to be cemented.

The quantity of gas generating chemical or chemicals combined with the cement composition and the number of delayed encapsulated activators having different release times can be selected and included in the cement composition so that gas is formed in the cement composition during one or more of the following stages. During pumping to foam the cement composition and provide thixotropy thereto, after the cement composition is placed in the subterranean zone to be cemented during the static cement composition gel strength development stage to compensate for cement shrinkage due to fluid loss or the like, during the cement composition transition time to prevent the inflow of formation fluid and during the setting of the cement to provide resiliency thereto. The term "cement composition transition time" is used herein to mean the time from when the cement composition column increases in gel strength to the level whereby there is a loss of ability to transmit hydrostatic pressure to when the cement composition sets into a hard impermeable mass.

The hydraulic cement compositions which can be utilized in accordance with the methods of this invention are basically comprised of a hydraulic cement, water present in an amount sufficient to form a slurry, the above described gas generating chemical or chemicals and the above described delayed encapsulated oxidizing agent activator or activators.

A variety of hydraulic cements can be utilized in the cement compositions including those comprised of calcium, aluminum, silicon, oxygen and/or sulfur which set and harden by reaction with water. Such hydraulic cements include Portland cements, pozzolana cements, gypsum cements, aluminous cements and silica cements. Portland cements or their equivalents are generally preferred for use in accordance with the present invention. Portland cements of the types defined and described in the *API Specification For Materials And Testing For Well Cements*, API Specification 10, $5^{th}$ edition, dated Jul. 1, 1990 of the American Petroleum Institute are particularly suitable. Preferred API Portland cements include classes A, B, C, G and H, with API classes G and H being the most preferred.

The water utilized in the cement compositions can be fresh water, unsaturated aqueous salt solutions such as brine or seawater and saturated aqueous salt solutions. The water is generally present in the cement compositions in an amount sufficient to form a slurry, i.e., an amount in the range of from about 30% to about 100% by weight of hydraulic cement in the compositions, more preferably in an amount in the range of from about 35% to about 60%.

As is well understood by those skilled in the art, the cement compositions of this invention can include a variety of additives for improving or changing the properties of the cement compositions. Examples of such additives include, but are not limited to, set retarding agents, fluid loss control agents, dispersing agents, set accelerating agents and formation conditioning agents.

As mentioned above, another treating fluid which can be utilized in accordance with the methods of this invention is a fracturing fluid for creating, extending and propping fractures in a subterranean zone to stimulate the production of hydrocarbons therefrom. The fracturing fluid utilized is generally a viscous alkaline fracturing fluid which forms the fractures in the subterranean zone and deposits proppant therein. Thereafter, the fracturing fluid breaks into a thin fluid which is produced back to the surface. Gas is generated in the fracturing fluid to facilitate the back flow of the fracturing fluid and its removal from the fractures. In accordance with the methods of this invention, one or more gas generating chemicals and one or more delayed encapsulated activators having selected release times are combined with the fracturing fluid on the surface. Thereafter, the fracturing fluid is pumped into the well bore and into a subterranean zone whereby fractures are formed in the zone. After the formation of the fractures, the fracturing fluid which includes a viscosity breaker reverts to a thin fluid, the pressure exerted on the fractured zone is reduced and gas is generated by the activated gas generating chemical or chemicals therein. The presence of the gas facilitates the back flow of the fracturing fluid from the fractures and its removal from the subterranean zone.

While a variety of fracturing fluids can be utilized, a preferred fracturing fluid for use in accordance with this invention is basically comprised of water, a hydrated galactomannan gelling agent, a retarded cross-linking and buffering composition which cross-links the hydrated galactomannan gelling agent and produces a highly viscous alkaline fluid, a delayed gel breaker for causing the viscous fracturing fluid to break into a thin fluid, one or more of the gas generating chemicals described above and one or more of the delayed encapsulated activators described above.

The water utilized for forming the fracturing fluid can be fresh water, salt water, brine or any other aqueous liquid which does not adversely react with other components of the fracturing fluid.

The galactomannan gelling agents which can be used are the naturally occurring gums and their derivatives such as guar, locust bean, tara, honey locust, tamarind, karaya, tragacanth, carragenan and the like. Of the various galactomannan gelling agents which can be utilized, one or more gelling agents selected from the group of guar and guar derivatives are preferred. Examples of guar derivatives which can be used include hydroxyethylguar, hydroxypropylguar, carboxymethylguar, carboxymethylhydroxy-ethylguar and carboxymethylhydroxypropylguar. Of these, carboxymethylhydroxypropylguar is the most preferred.

While various cross-linking agents or compositions can be utilized, a retarded cross-linking composition comprised of a liquid solvent, an organotitanate chelate and a borate ion producing compound is generally preferred. Various delayed gel breakers can also be utilized in the fracturing fluids of this invention. A preferred delayed breaker is a mixture of calcium hypochlorite or an alkali metal chlorite or hypochlorite and optionally, an activator such as a copper ion producing compound, e.g., copper EDTA. Such breakers and activators are described in U.S. Pat. No. 5,413,178 issued to Walker et al. on May 9, 1995; U.S. Pat. No. 5,669,446 issued to Walker et al. on Sep. 23, 1997; and U.S. Pat. No. 5,950,731 issued to Suchart et al. on Sep. 14, 1999, the disclosures of which are all incorporated herein by reference thereto.

Thus, an improved method of generating gas in and foaming an alkaline well treating fluid introduced into a subterranean zone penetrated by a well bore is comprised of the following steps: (a) combining one or more gas generating chemicals with a well treating fluid; (b) combining one or more delayed encapsulated activators having selected release times with the well treating fluid containing the gas generating chemicals formed in step (a) so that the one or more gas generating chemicals react with the one or more delayed encapsulated activators and gas and foam are formed in the treating fluid while the treating fluid is being pumped or at one or more times after the treating fluid has been placed in the subterranean zone, or both; and (c) pumping the treating fluid formed in step (b) into the well bore and into the subterranean zone.

An improved method of this invention for generating gas in an alkaline well cement composition introduced into a subterranean zone penetrated by a well bore is comprised of the following steps: (a) combining one or more gas generating chemicals selected from the group consisting of azodicarbonamide, carbohydrazide and mixtures thereof with the cement composition; (b) combining one or more delayed encapsulated oxidizing agent activators having selected release times with the cement composition containing the gas generating chemicals formed in step (a) so that the gas generating chemicals react with the one or more delayed encapsulated oxidizing agent activators and gas is formed in the cement composition while the cement composition is being pumped and at one or more times after the cement composition has been placed in the subterranean zone, the oxidizing agents in the delayed encapsulated oxidizing agent activators having selected release times being selected from the group consisting of alkali and alkaline earth metal salts of peroxide, persulfate, perborate, hypochlorite, hypobromite, chlorate, iodate, bromate, chloroaurate, arsenate, antimonite and molybate anions and (c) pumping the cement composition formed in step (b) into the well bore and into the subterranean zone.

An improved method of generating gas in a viscous alkaline well fracturing fluid which is introduced into a subterranean zone penetrated by a well bore, which forms fractures in the subterranean zone and then breaks into a thin fluid comprises the steps of: (a) combining one or more gas generating chemicals with the fracturing fluid; (b) combining one or more delayed encapsulated activators having selected release times with the fracturing fluid containing the gas generating chemicals formed in step (a) so that the gas generating chemicals react with the delayed encapsulated activators and gas is formed in the fracturing fluid after fractures have been formed in the subterranean zone and during and after the fracturing fluid breaks into a thin fluid whereby the gas facilitates the back flow of the fracturing fluid and its removal from the fractures; and (c) pumping the fracturing fluid formed in step (b) into the well bore and into the subterranean zone.

In order to further illustrate the methods of the present invention, the following example is given.

EXAMPLE

A cement slurry was prepared by mixing 748 grams of API Class G cement, 336 grams of deionized water, 7.5 grams of bentonite clay, 1.5 grams of carboxymethylhydroxyethyl cellulose, 3.0 grams lignosulfonate retarder and 36.3 grams of ammonium persulfate in a Waring blender according to API Specifications. A foaming and foam stabilizing surfactant was hand mixed into the slurry followed by 3.0 grams of toluenesulfonyl hydrazide. The calculated density of the slurry was 15.80 pounds per gallon. The gas evolution with concurrent foaming of the slurry was instantaneous. The slurry was allowed to expand for 420 minutes. As shown in Table 1 below, the slurry density measured at the end per gallon. The percent of nitrogen formed was calculated to be 78.3% by volume of the slurry.

In a second experiment, 45.4 grams of encapsulated ammonium persulfate with 80% active content were used in place of the non-encapsulated ammonium persulfate used in the first experiment. 100 cc of the cement slurry described in the first experiment except for the change described herein were added to a graduated cylinder and the volume increase of the slurry was measured over time. This experiment was conducted as described in the first experiment. The results are also presented in Table 1 below.

In a third experiment, a sample of encapsulated ammonium persulfate (59.5 grams) with 60% active content was used in place of the non-encapsulated ammonium persulfate used in the first experiment. The encapsulated material used in this experiment had a higher polymer coating and was designed to release the encapsulated material more slowly than that used in the second experiment. This experiment was also conducted as described in the first experiment. The volume increase of the slurry over time is also presented in Table 1 below.

In a fourth experiment, the toluenesulfonyl hydrazide used in the first experiment was replaced by 5.6 grams of carbohydrazide and the amount of non-encapsulated ammonium persulfate was decreased to 28 grams. This experiment was also conducted as described in the first experiment. The gas evolution was again found to be instantaneous. As shown in Table 2, the set cement density at the end of 18 hrs. was 3.89 pounds per gallon, which corresponded to the presence of 75% nitrogen gas.

In a fifth experiment, the non-encapsulated ammonium persulfate used in the fourth experiment was replaced by 34.8 grams encapsulated ammonium persulfate with 80% active component. This experiment was also conducted as described in the first experiment. The cement density measured at the end of 18 hrs. was 14.12 pounds per gallon. The volume increase of the slurry over time is presented in Table 2 below.

In a sixth experiment, the non-encapsulated ammonium persulfate used in the fourth experiment was replaced by 45.8 grams of encapsulated ammonium persulfate with 60% active component. This experiment was also conducted as described in the first experiment. The final density at the end of 18 hrs. was 14.62 pounds per gallons. The volume increase of the slurry over time is given in Table 2 below.

TABLE 1

| Time In Minutes | Ammonium Persulfate (non-encapsulated), 5.0% by weight of cement Volume | Encapsulated Ammonium Persulfate I[1], 6.25% by weight of cement Volume | Encapsulated Ammonium Persulfate II[2], 8.33% by weight of cement Volume |
|---|---|---|---|
| 0 | Instantaneous[3] | 100 ml | 100 ml |
| 5 | " | 105 ml | 100 ml |
| 10 | " | 106 ml | 100 ml |
| 15 | " | 108 ml | 100 ml |
| 30 | " | 130 ml | 100 ml |
| 60 | " | 138 ml | 101 ml |
| 90 | " | 176 ml | 104 ml |
| 120 | " | 176 ml | 106 ml |
| 150 | " | 176 ml | 110 ml |
| 180 | " | 176 ml | 114 ml |
| 210 | " | 176 ml | 128 ml |
| 240 | " | 176 ml | 130 ml |
| 300 | " | 176 ml | 140 ml |
| 360 | " | 176 ml | 148 ml |
| 420 | " | 176 ml | 150 ml |
| Slurry Density @ 420 minutes | 3.39 lb/gal (after foaming) | 11.49 lb/gal | 11.9 lb/gal |

[1]80% active ammonium persulfate content
[2]60% active ammonium persulfate content
[3]The gas evolution was complete in less than a minute

TABLE 2

| Time In Minutes | Ammonium Persulfate (non-encapsulated), 3.75% by weight of cement Volume | Encapsulated Ammonium Persulfate I[1], 4.69% by weight of cement Volume | Encapsulated Ammonium Persulfate II[2], 8.33% by weight of cement Volume |
|---|---|---|---|
| 0 | Instantaneous[3] | 100 ml | 100 ml |
| 5 | " | 102 ml | 100 ml |
| 10 | " | 104 ml | 100 ml |
| 15 | " | 106 ml | 100 ml |
| 30 | " | 120 ml | 100 ml |
| 60 | " | 166 ml | 100 ml |
| 90 | " | 180 ml | 102 ml |
| 120 | " | 180 ml | 102 ml |
| 18 hrs. | " | 180 ml | 160 ml |
| Ultimate Density @18 hrs. | 3.89 lb/gal (after foaming) | 14.12 lb/gal (base) | 14.62 lb/gal (base) |

[1] 80% active ammonium persulfate content
[2] 60% active ammonium persulfate content
[3] The gas evolution was complete in less than a minute The results in Tables 1 and 2 clearly show that the nitrogen gas generation can be delayed by controlling the release of the oxidizing agent into the cement slurry. The desired rate of gas generation can be accomplished by controlling the amount of the encapsulating coating.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. An improved method of generating gas in and foaming an alkaline well treating fluid introduced into a subterranean zone penetrated by a well bore comprising the steps of:
   (a) combining one or more gas generating chemicals with said well treating fluid;
   (b) combining one or more delayed encapsulated activators having selected release times with said well treating fluid containing said gas generating chemicals formed in step (a) so that said gas generating chemicals react with said one or more delayed encapsulated activators and gas and foam are formed in said treating fluid while said treating fluid is being pumped or at one or more times after said treating fluid has been placed in said subterranean zone, or both; and
   (c) pumping said treating fluid formed in step (b) into said well bore and into said subterranean zone.

2. The method of claim 1 wherein said gas generating chemical is selected from the group consisting of hydrazine, azodicarbonamide, azobis(isobutyronitrile), p-toluene sulfonyl hydrazide, p-toluene sulfonyl semicarbazide, carbohydrazide, p-p'-oxybis(benzenesulfonylhydrazide) and mixtures thereof.

3. The method of claim 1 wherein said activators in said one or more delayed encapsulated activators having selected release times are selected from the group consisting of alkali and alkaline earth metal salts of peroxide, persulfate, perborate, hypochlorite, hypobromite, chlorite, chlorate, iodate, bromate, chloroaurate, arsenate, antimonite and molybate anions.

4. The method of claim 1 wherein said one or more activators are solids and are encapsulated in coating materials selected from the group consisting of waxes, drying oils, polyurethanes and cross-linked partially hydrolyzed polyacrylics.

5. The method of claim 1 wherein said one or more activators are aqueous solutions and are encapsulated in a particulate porous solid material which remains dry and free flowing after absorbing an aqueous solution and through which said aqueous solution slowly diffuses.

6. The method of claim 5 wherein said particulate porous solid material is selected from the group consisting of metal oxides, metal salts of alumino-silicates and cross-linked porous synthetic polymeric materials.

7. The method of claim 5 wherein said particulate porous solid material in which said activators are encapsulated further comprises an external coating of a polymeric material through which said aqueous solution slowly diffuses and said activators are oxidizing agent activators.

8. The method of claim 7 wherein said polymeric material is selected from the group consisting of EDPM rubber, polyvinyldichloride (PVDC), nylon, waxes, polyurethanes and cross-linked partially hydrolyzed acrylics.

9. The method of claim 1 wherein said alkaline well treating fluid is an aqueous cement composition.

10. The method of claim 1 wherein said alkaline well treating fluid is an aqueous fracturing fluid.

11. The method of claim 1 which further comprises the step of combining a mixture of foaming and foam stabilizing surfactants with said well treating fluid.

12. The method of claim 11 wherein said mixture of foaming and foam stabilizing surfactants is comprised of an ethoxylated alcohol ether sulfate surfactant, an alkyl or alkene amidopropyl betaine surfactant and an alkyl or alkene amidopropyl dimethylamine oxide surfactant.

13. An improved method of generating gas in an alkaline well cement composition introduced into a subterranean zone penetrated by a well bore comprising the steps of:
   (a) combining one or more gas generating chemicals selected from the group consisting of azodicarbonamide, carbohydrazide and mixtures thereof with said cement composition;
   (b) combining one or more delayed encapsulated oxidizing agent activators having different selected release times with said cement composition containing said gas generating chemicals formed in step (a) so that said gas generating chemicals react with said one or more delayed encapsulated oxidizing agent activators and gas is formed in said cement composition while said cement composition is being pumped and at one or more times after said cement composition has been placed in said subterranean zone, said oxidizing agent in said delayed encapsulated oxidizing agent activators having different release times being selected from the group consisting of ammonium persulfate, sodium persulfate, potassium persulfate, sodium chlorite, sodium chlorate, hydrogen peroxide, sodium perborate and sodium peroxy carbonate; and (c) pumping said cement composition formed in step (b) into said well bore and into said subterranean zone.

14. The method of claim 13 wherein said one or more activators are solids and are encapsulated in coating materials selected from the group consisting of waxes, drying oils, polyurethanes and cross-linked partially hydrolyzed polyacrylics.

15. The method of claim 13 wherein said oxidizing agent activators are aqueous solutions and are encapsulated in a particulate porous solid material which remains dry and free flowing after absorbing an aqueous solution and through which said aqueous solution slowly diffuses.

16. The method of claim 15 wherein said particulate porous solid material is selected from the group consisting of metal oxides, metal salts of alumino-silicates and cross-linked porous synthetic polymeric materials.

17. The method of claim 15 wherein said particulate porous solid material in which said oxidizing agent activators are encapsulated further comprises an external coating of a polymeric material through which said aqueous solution slowly diffuses.

18. The method of claim 17 wherein said polymeric material is selected from the group consisting of EDPM rubber, polyvinyldichloride (PVDC), nylon, waxes, polyurethanes and cross-linked partially hydrolyzed acrylics.

19. The method of claim 13 wherein said cement composition is comprised of a hydraulic cement and sufficient water to form a pumpable slurry.

20. The method of claim 19 wherein said hydraulic cement is Portland cement or the equivalent.

21. The method of claim 19 wherein said water is selected from the group consisting of fresh water, unsaturated salt solutions and saturated salt solutions.

22. An improved method of generating gas in an alkaline well cement composition introduced into a subterranean zone penetrated by a well bore comprising the steps of:

(a) combining one or more gas generating chemicals selected from the group consisting of azodicarbonamide, carbohydrazide and mixtures thereof with said cement composition;

(b) combining one or more delayed encapsulated oxidizing agent activators having different selected release times with said cement composition containing said gas generating chemicals formed in step (a) so that said gas generating chemicals react with said one or more delayed encapsulated oxidizing agent activators and gas is formed in said cement composition during one or more of the stages of: pumping to foam said composition and provide thixotropy thereto; after being placed in said subterranean zone during the static cement composition gel strength development stage to compensate for cement shrinkage due to fluid loss; during the cement transition time to prevent the inflow of formation fluids; and during setting of the cement to provide resiliency thereto, said oxidizing agent in said delayed encapsulated oxidizing agent activators having different release times being selected from the group consisting of ammonium persulfate, sodium persulfate, potassium persulfate, sodium chlorite, sodium chlorate, hydrogen peroxide, sodium perborate and sodium peroxy carbonate; and (c) pumping said cement composition formed in step (b) into said well bore and into said subterranean zone.

23. An improved method of generating gas in a viscous alkaline well fracturing fluid which is introduced into a subterranean zone penetrated by a well bore, which forms fractures in said subterranean zone and then breaks into a thin fluid comprising the steps of:

(a) combining one or more gas generating chemicals with said fracturing fluid;

(b) combining one or more delayed encapsulated activators having selected release times with said fracturing fluid containing said gas generating chemicals formed in step (a) so that said gas generating chemicals react with said delayed encapsulated activators and gas is formed in said fracturing fluid after fractures have been formed in said subterranean zone and during and after said fracturing fluid breaks into a thin fluid whereby said gas facilitates the back flow of said fracturing fluid and its removal from said fractures; and (c) pumping said fracturing fluid formed in step (b) into said well bore and into said subterranean zone.

24. The method of claim 23 wherein said gas generating chemical is selected from the group consisting of azodicarbonamide, carbohydrazide and mixtures thereof.

25. The method of claim 23 wherein said activator in said one or more delayed encapsulated activators having selected release times are selected from the group consisting of alkali and alkaline earth metal salts of peroxide, persulfate, perborate, hypochlorite, hypobromite, chlorite, chlorate, iodate, bromate, chloroaurate, arsenate, antimonite and molybate anions.

26. The method of claim 23 wherein said one or more activators are solids and are encapsulated in coating materials selected from the group consisting of waxes, drying oils, polyurethanes and cross-linked partially hydrolyzed polyacrylics.

27. The method of claim 23 wherein said one or more activators are aqueous solutions and are encapsulated in a particulate porous solid material which remains dry and free flowing after absorbing an aqueous solution and through which said aqueous solution slowly diffuses.

28. The method of claim 27 wherein said particulate porous solid material is selected from the group consisting of metal oxides, metal salts of alumino-silicates and cross-linked porous synthetic polymeric materials.

29. The method of claim 27 wherein said particulate porous solid material in which said activators are encapsulated further comprises an external coating of a polymeric material through which said aqueous solution slowly diffuses.

30. The method of claim 29 wherein said polymeric material is selected from the group consisting of EDPM rubber, polyvinyldichloride (PVDC), nylon, waxes, polyurethanes and cross-linked partially hydrolyzed acrylics.

31. An improved method of generating gas in a viscous alkaline well fracturing fluid which is introduced into a subterranean zone penetrated by a well bore, which forms fractures in said subterranean zone and then breaks into a thin fluid comprising the steps of:

(a) combining one or more gas generating chemicals with said viscous alkaline fracturing fluid wherein said viscous alkaline fracturing fluid is a gelled and cross-linked aqueous fluid;

(b) combining one or more delayed encapsulated activators having selected release times with said fracturing fluid containing said gas generating chemicals formed in step (a) so that said gas generating chemicals react with said delayed encapsulated activators and gas is formed in said fracturing fluid after fractures have been formed in said subterranean zone and during and after said fracturing fluid breaks into a thin fluid whereby said gas formed in said fracturing fluid is an acidic gas which facilitates the breaking of said viscous fracturing fluid into a thin fluid and whereby said gas facilitates the back flow of said fracturing fluid and its removal from said fractures; and (c) pumping said fracturing fluid formed in step (b) into said well bore and into said subterranean zone.

32. An improved method of generating gas in a viscous alkaline well fracturing fluid which is introduced into a subterranean zone penetrated by a well bore, which forms fractures in said subterranean zone and then breaks into a thin fluid comprising the steps of:

(a) combining a gas generating chemical with said viscous alkaline fracturing fluid wherein said gas generating chemical is azodicarbonamide and wherein said viscous alkaline fracturing fluid is a gelled and cross-linked aqueous fluid;

(b) combining a delayed encapsulated activator having a selected release time, said activator being ammonium persulfate, with said fracturing fluid containing said gas generating chemicals formed in step (a) so that said gas generating chemicals react with said delayed encapsulated activators and gas is formed in said fracturing fluid after fractures have been formed in said subterranean zone and during and after said fracturing fluid breaks into a thin fluid whereby said gas formed in said fracturing fluid is an acidic gas which includes carbon dioxide and which facilitates the breaking of said viscous fracturing fluid into a thin fluid and whereby said gas facilitates the back flow of said fracturing fluid and its removal from said fractures; and (c) pumping said fracturing fluid formed in step (b) into said well bore and into said subterranean zone.

* * * * *